Jan. 6, 1925.  1,521,677
W. A. FULD ET AL
TIRE TOOL
Filed May 6, 1924
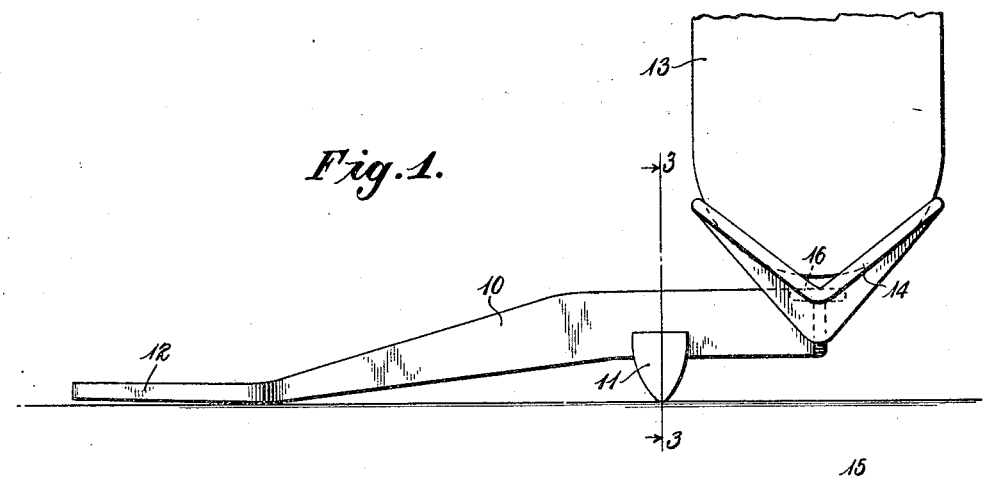
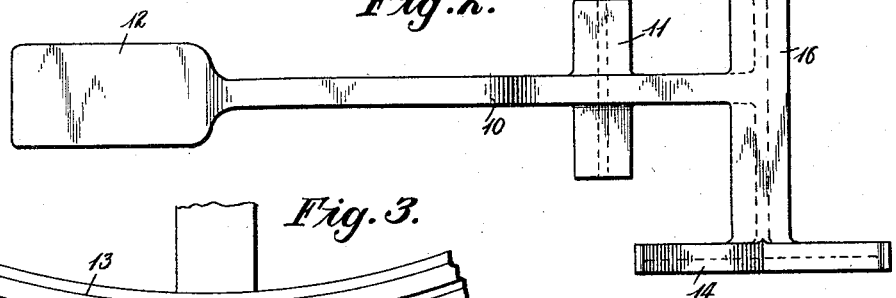
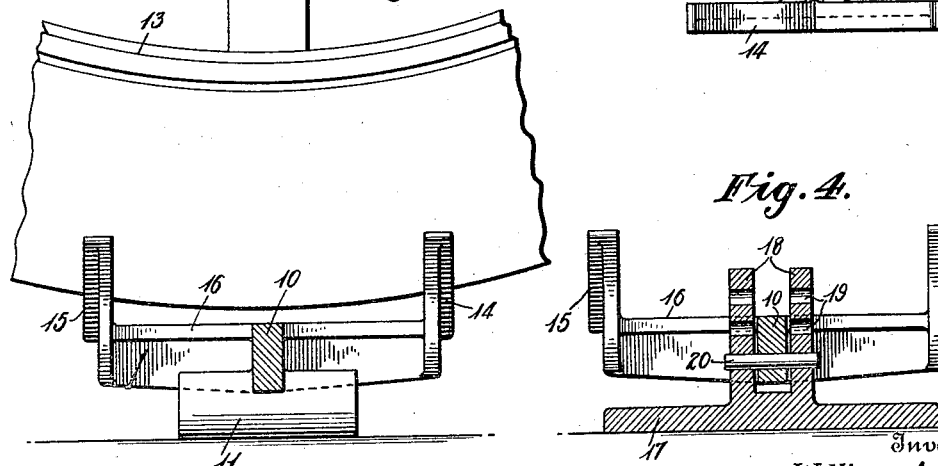
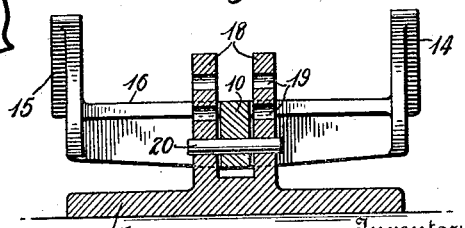
Inventors
William A. Fuld
and Paul A. Fuld
By Brown & Phelps
Attorneys Patented Jan. 6, 1925.

1,521,677

UNITED STATES PATENT OFFICE.

WILLIAM A. FULD AND PAUL A. FULD, OF BALTIMORE, MARYLAND.

TIRE TOOL.

Application filed May 6, 1924. Serial No. 711,386.

*To all whom it may concern:*

Be it known that we, WILLIAM A. FULD and PAUL A. FULD, citizens of the United States, residing in the city of Baltimore and State of Maryland, have invented certain new and useful Improvements in Tire Tools, of which the following is a specification.

The invention relates to devices for preventing the revolution of a jacked up wheel while the fastenings for a demountable rim are being manipulated, and has as an object the provision of a device which may be placed upon the tire when the wheel is jacked up to prevent awkward movements of the wheel while the fastenings for the demountable rim are being removed or replaced.

A further object of the invention is the provision of a device of the class referred to which has a minimum of parts, and therefore is incapable of getting out of order.

Further objects of the invention will appear from the following description when read in connection with the accompanying drawing showing an illustrative embodiment of the invention, and in which—

Fig. 1 is a side elevation of the device showing diagrammatically a portion of the tire.

Fig. 2 is a plan view.

Fig. 3 is a transverse section on line 3, 3 of Fig. 1.

Fig. 4 is a section corresponding to Fig. 3, showing a modified form.

As shown, the device comprises a lever 10 having a fulcrum 11 which, in the form of Figs. 1 to 3 inclusive, is preferably cast integral with the material of the lever 10. The form of these three figures may desirably be made of a single casting and cast iron or aluminum are found to be desirable materials from which to form the device. To manipulate the lever 10 a foot-receiving extremity, at 12, is shown upon which the foot of the user may be placed while working upon the jacked up wheel 13.

To contact with the tire upon the wheel, there is shown a pair of separated V-shaped jaw members 14, 15, carried by a transverse head 16, which in turn is carried by the end of the lever 10.

In the form of the invention shown in Fig. 4, an adjustable fulcrum is shown whereby the height of the lever 10 from the ground may be varied to set the distance of the tire, or wheel 13, from the ground, the adjustable fulcrum shown comprises a base member 17 with a pair of spaced standards 18 rising therefrom. A series of openings 19 are shown in the standards for reception of a pin 20 which may be passed through selected openings and through an opening in the lever 10 whereby the elevation of the lever may be adjusted to suit conditions.

When the wheel has been jacked up for purposes of moving a tire, the jaws 14 will be slipped under the tire with the treadle extremity 12 elevated, after which the weight of the foot upon the treadle member will cause the device to assume the position shown in Fig. 1, and consequently act as a brake upon the tire to prevent awkward movements of the wheel while manipulating the fastenings.

Minor changes may be made in the physical embodiment of the invention without departing from its spirit.

We claim:

1. A tire tool, comprising a lever, a fulcrum attached thereto intermediate its ends, a tire engaging portion carried by one end of the lever and a pedal extremity at the opposite end of the lever.

2. A tire tool comprising a lever arm, a fulcrum secured to said arm intermediate its ends, a tire engaging portion carried by one end of the lever comprising upwardly and outwardly diverging portions, a pedal extremity upon the other end of the arm.

3. A tire tool comprising a lever arm, a fulcrum carried by the said arm intermediate its ends and projecting downwardly from said arm, a tire engaging member carried by one end of the arm comprising a transverse member mounted upon its central portion upon the end of the arm, and upwardly and outwardly diverging tire engaging members mounted upon each end of the transverse member, a pedal extremity at the opposite end of the lever arm.

4. A tire tool comprising a lever arm, a fulcrum carried by said arm adjacent one end thereof, a tire engaging member carried by said end of the arm and comprising a transverse bar, upwardly and outwardly tire engaging jaws mounted upon each end of the bar, a pedal upon the extremity of the longer portion of the lever arm.

5. A tire tool comprising an integral article embodying a lever arm, a fulcrum carried by said arm adjacent one end thereof and comprising a transverse member projecting laterally upon each side of the arm, a bar carried by the end of said arm projecting transversely parallel with the said fulcrum, a tire engaging jaw mounted upon each end of said last named bar and diverging upwardly and outwardly for engagement with a tire, a pedal extremity carried by the opposite end of the lever arm.

WILLIAM A. FULD.
PAUL A. FULD.